US012647637B2

(12) United States Patent
Arling et al.

(10) Patent No.: US 12,647,637 B2
(45) Date of Patent: *Jun. 2, 2026

(54) SYSTEMS AND METHODS FOR A CUSTOMIZED MEDIA ACCESS USER EXPERIENCE WITH PRIVACY SETTINGS

(71) Applicant: Universal Electronics Inc., Scottsdale, AZ (US)

(72) Inventors: Paul D. Arling, Irvine, CA (US); Arsham Hatambeiki, Irvine, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,825

(22) Filed: Apr. 18, 2023

(65) Prior Publication Data

US 2023/0254525 A1 Aug. 10, 2023

Related U.S. Application Data

(63) Continuation of application No. 17/075,300, filed on Oct. 20, 2020, now Pat. No. 11,653,050, which is a continuation-in-part of application No. 16/855,324, filed on Apr. 22, 2020, which is a continuation of application No. 16/656,153, filed on Oct. 17, 2019, now abandoned.

(51) Int. Cl.
*H04N 21/422* (2011.01)
*H04N 21/475* (2011.01)

(52) U.S. Cl.
CPC ... *H04N 21/4222* (2013.01); *H04N 21/42224* (2013.01); *H04N 21/42226* (2013.01); *H04N 21/4753* (2013.01)

(58) Field of Classification Search
None
See application file for complete search history.

(56) References Cited

U.S. PATENT DOCUMENTS 6,714,865 B2 3/2004 Angwin et al.
8,527,076 B2 9/2013 Shimizu
(Continued)

FOREIGN PATENT DOCUMENTS

EP 2608480 A2 2/2019
WO 0154292 A1 7/2001
(Continued)

OTHER PUBLICATIONS

Final Office Action from U.S. Appl. No. 16/656,153, dated Aug. 25, 2023, 23 pp.
(Continued)

*Primary Examiner* — Samira Monshi
(74) *Attorney, Agent, or Firm* — Greenberg Traurig, LLP

(57) ABSTRACT

A method of controlling the operating mode of a remote device based upon a local user preference setting includes determining a user privacy setting by a user at a local device and storing the user privacy setting. The user privacy setting is conveyed to the remote device and the operational mode of the remote device is modified based upon the transmitted user privacy preference setting. The operational mode of the remote device is returned to the normal operational mode upon meeting a predetermined condition.

18 Claims, 5 Drawing Sheets

(56) References Cited

U.S. PATENT DOCUMENTS

| | | | |
|---|---|---|---|
| 8,700,106 | B2 | 4/2014 | Hilbrink et al. |
| 8,922,616 | B2 | 12/2014 | Mock |
| 9,462,423 | B1 | 10/2016 | Rivlin et al. |
| 10,063,625 | B2 | 8/2018 | Arling et al. |
| 10,107,516 | B2 | 10/2018 | Komiya et al. |
| 2003/0079038 | A1 | 4/2003 | Robbin |
| 2005/0021379 | A1 | 1/2005 | Ishibashi |
| 2006/0020790 | A1 | 1/2006 | Sprunk |
| 2006/0026638 | A1 | 2/2006 | Stark et al. |
| 2006/0041655 | A1* | 2/2006 | Holloway ........ H04N 21/42224 709/223 |
| 2007/0143824 | A1 | 6/2007 | Shahbazi |
| 2007/0269024 | A1 | 11/2007 | Dalrymple et al. |
| 2008/0196057 | A1 | 8/2008 | Li |
| 2009/0059090 | A1 | 3/2009 | Fan et al. |
| 2009/0245491 | A1* | 10/2009 | Wang ................. H04L 65/1046 379/102.03 |
| 2010/0157170 | A1 | 6/2010 | Carlsgaard et al. |
| 2010/0229194 | A1 | 9/2010 | Blanchard et al. |
| 2011/0069940 | A1 | 3/2011 | Shimy |
| 2011/0289113 | A1 | 11/2011 | Arling et al. |
| 2011/0294515 | A1 | 12/2011 | Chen et al. |
| 2012/0081615 | A1 | 4/2012 | Starr et al. |
| 2013/0066832 | A1 | 3/2013 | Sheehan |
| 2013/0167170 | A1 | 6/2013 | Klappert et al. |
| 2013/0268999 | A1 | 10/2013 | Kiang |
| 2014/0100895 | A1 | 4/2014 | Chen |
| 2014/0298414 | A1 | 10/2014 | Alsina et al. |
| 2014/0358685 | A1 | 12/2014 | Want et al. |
| 2015/0279205 | A1 | 10/2015 | Arling et al. |
| 2015/0334457 | A1 | 11/2015 | Chandel |
| 2015/0373295 | A1 | 12/2015 | Outters |
| 2016/0014460 | A1 | 1/2016 | Moran et al. |
| 2016/0034999 | A1 | 2/2016 | Mcbride |
| 2016/0100199 | A1 | 4/2016 | DuBose |
| 2016/0117458 | A1 | 4/2016 | Hermans et al. |
| 2016/0142765 | A1 | 5/2016 | Ogle et al. |
| 2017/0139664 | A1 | 5/2017 | Park |
| 2017/0195698 | A1 | 7/2017 | Patrick et al. |
| 2017/0195735 | A1 | 7/2017 | Kaliamoorthi et al. |
| 2017/0214668 | A1 | 7/2017 | Mityagin |
| 2018/0063857 | A1* | 3/2018 | Caplan ............. H04N 21/25866 |
| 2018/0260534 | A1 | 9/2018 | Fairbairn |
| 2018/0337929 | A1 | 11/2018 | Kurian |
| 2019/0114060 | A1 | 4/2019 | Resudek |
| 2019/0147175 | A1 | 5/2019 | Varerkar et al. |
| 2019/0222562 | A1 | 7/2019 | Ziebell |
| 2019/0310820 | A1 | 10/2019 | Bates |
| 2019/0349382 | A1 | 11/2019 | Thomas |
| 2020/0014643 | A1* | 1/2020 | Moon ................... H04L 51/224 |
| 2020/0196141 | A1* | 6/2020 | Baker ................... H04W 12/02 |
| 2020/0288522 | A1 | 9/2020 | Ma et al. |
| 2023/0254525 | A1 | 8/2023 | Arling |

FOREIGN PATENT DOCUMENTS

| | | | |
|---|---|---|---|
| WO | 2016/183400 | A1 | 11/2016 |
| WO | 2023116493 | A1 | 6/2023 |

OTHER PUBLICATIONS

U.S. Patent and Trademark Office, Final Office Action issued in U.S. Appl. No. 16/855,324, dated Jul. 6, 2023, 20 pgs.

U.S. Patent and Trademark Office, Non-Final Office Action issued in U.S. Appl. No. 16/656,153, dated May 15, 2023, 20 pgs.

U.S. Patent and Trademark Office, Non-Final Office Action issued in U.S. Appl. No. 16/855,324, dated Sep. 11, 2020, 32 pgs.

U.S. Patent and Trademark Office, Final Office Action issued in U.S. Appl. No. 16/656,153, dated Oct. 19, 2022, 53 pgs.

EPO, extended European search report issued on European patent application No. 20876970.3, dated Oct. 14, 2022, 9 pages.

U.S. Patent and Trademark Office, Non-Final Office Action issued in U.S. Appl. No. 16/656,153, dated Jun. 8, 2022, 40 pgs.

U.S. Patent and Trademark Office, Non-Final Office Action issued in U.S. Appl. No. 16/855,324, dated Jun. 23, 2022, 9 pgs.

ISA/US, Int. Search Report and Written Opinion issued on PCT application No. PCT/US2021/54423, dated Jan. 24, 2022, 14 pages.

ISA/US, Int. Search Report and Written Opinion issued on PCT application No. PCT/US20/54739, dated Nov. 19, 2020, 6 pages.

U.S. Patent and Trademark Office, Non-Final Office Action issued in U.S. Appl. No. 17/075,300, dated Jul. 22, 2022, 17 pgs.

U.S. Patent and Trademark Office, Non-Final Office Action issued in U.S. Appl. No. 16/855,324, dated Jan. 5, 2023, 20 pgs.

Cooper Center for Democracy & Technology H Tschofenig Nokia Siemens Networks A: Overview of Universal Opt-Out Mechanisms for Web Tracking; draft-cooper-web-tracking-optouts-00.txt, Standardworkingdraft, Internet Society (ISOC) 4, Rue Des Falaises CH-1205 Geneva, Switzerland, Mar. 7, 2011 (Mar. 7, 2011), pp. 1-20, XP015074338, [retrieved on Mar. 7, 2011].

Extended Search Report from European application No. 21883558.5, dated Apr. 15, 2024, 22 pp.

Office Action from U.S. Appl. No. 18/823,943, dated Jan. 12, 2026, 18 pp.

International Search Report and Written Opinion of international application No. PCT/US2025/044871, dated Nov. 21, 2025, 43 pp.

* cited by examiner

SYSTEMS AND METHODS FOR A CUSTOMIZED MEDIA ACCESS USER EXPERIENCE WITH PRIVACY SETTINGS

CROSS REFERENCE TO RELATED APPLICATION

This application claims the benefit of U.S. patent application Ser. No. 17/075,300, filed on Oct. 20, 2020, which application claims the benefit and is a continuation-in-part of U.S. patent application Ser. No. 16/855,324 filed on Apr. 22, 2020, which claims the benefit and is a continuation of U.S. patent application Ser. No. 16/656,153, filed on Oct. 17, 2019, each of which are incorporated herein by reference in their entirety.

FIELD OF THE DISCLOSURE

The present description relates generally to a customized user experience and more particularly to various systems and methods for a customized media access user experience.

BACKGROUND OF RELATED ART

Personal communication, productivity, and entertainment devices such as cellular phones, tablet computers, e-books, hand-held games, portable media players, PDAs, etc. are known to include features such as graphical user interfaces, some with touch screens, Bluetooth and/or WiFi capability, etc. Many such devices also incorporate support for ancillary applications (hereafter referred to as "apps") for example calendars, email, games, social media interfaces, video streaming, music streaming, cable TV provider support and/or streaming, maps and navigation, etc. Furthermore, in some instances support for such apps may also be provided as a feature of certain entertainment appliances such as for example so-called "smart TVs," cable or satellite set top boxes, etc. For the sake of brevity, all such app capable devices whether personal/portable or appliance-based, will be collectively referred to hereafter as "smart devices."

Contemporaneously, each of the above-noted devices may accept a certain level of customization and/or preference retention. For example, a user's cellular phone may include various user interfaces and apps that are chosen and customized to the user's preference. It is also understood that loss of customization and/or preferences due to a failure to synchronize settings between various smart devices is a cause for user dissatisfaction and frustration. To overcome the above described problem, the system and method described hereinafter will present customized media access user experience when the user visits a remote or foreign location, such as a hotel.

SUMMARY

The following relates generally to improved methods for configuration of a smart device and/or remote control based upon stored user customizations, and, more particularly, to methods for presenting a graphical user interface (GUI) on a smart device and/or a remote control, which may utilize a geographic location and a user profile, to identify the user, display a customized and preferential experience, and alternatively configure a remote control to operate with the local device. Furthermore, as some remote locations, such as hotels, require additional security features, such as when a user vacates the premises, the example methods and systems provide for verification of the present customizations and a deletion of any user specific customization or preference when leaving the location.

To this end, in some examples, a smart device may utilize any convenient method for determining the current user credentials and customize the smart device and/or remote control accordingly. In some examples, the smart device may utilize the geographical location of the smart device and/or remote control, such as for example and without limitation a built-in GPS receiver system; hybrid mobile phone geo-positioning as described for example in U.S. Patent Publication No. 2011/0294515, incorporated herein by reference in its entirety; determination of position information based on multiple sources such as described in U.S. Pat. No. 6,714,865, also incorporated herein by reference in its entirety; or any other means as appropriate for a particular embodiment. In certain examples, the smart device app may also communicate with other appliances present in the local environment, for example a cable or satellite STB, in conjunction with or in place of the location determination techniques described above, in order to determine and/or further refine an appropriate user customization for display to the user.

A better understanding of the objects, advantages, features, properties and relationships of the various aspects described hereinafter will be obtained from the following detailed description and accompanying drawings which set forth illustrative embodiments and which are indicative of the various ways in which the principles of the invention claimed hereinafter may be employed.

DETAILED DESCRIPTION

Figure 1:
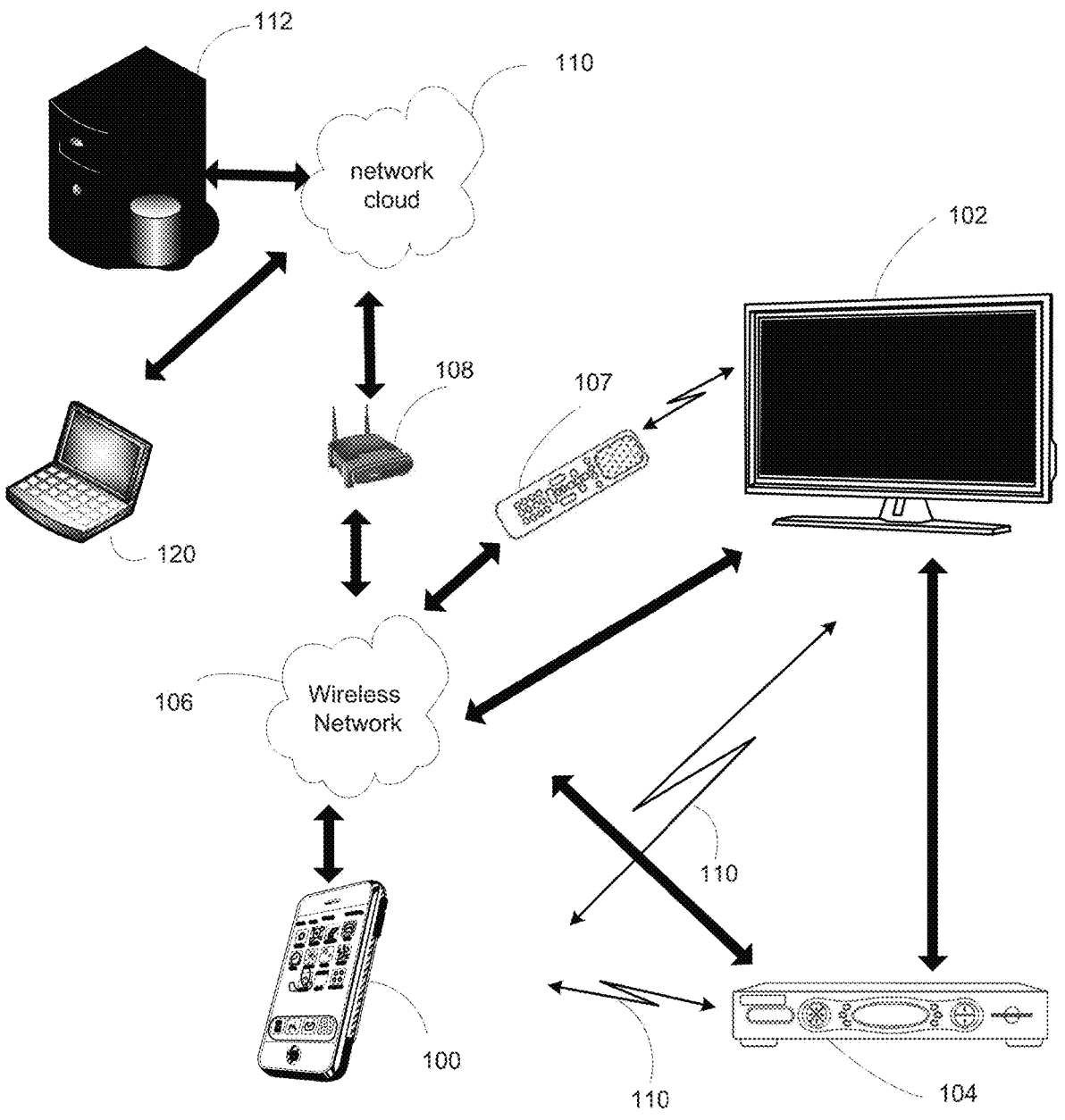
FIG. 1 illustrates an example system in which a smart device is a member of a wireless network and in which the smart device is equipped with a customizable user interface according to the disclosure that follows.

The following description of example methods and apparatus is not intended to limit the scope of the description to the precise form or forms detailed herein. Instead the following description is intended to be illustrative so that others may follow its teachings.

In the present disclosure, a customized media access experience is provided to a user when the user visits a remote location, such as a hotel, or other suitable accommodation, including by way of example, vacation home rental, cruise ship, home-sharing rental, timeshare, hostel, serviced apartment, or the like. The customized user experience can be implemented on a user interface associated with any suitable entertainment device, such as a smart device including, for example but not limited to, cellular phones, tablet computers, e-books, smart watches, smart jewelry (e.g., a ring, a necklace, a bracelet, etc.), wireless glasses, smart apparel, any other wearable electronic device, hand-held games, portable media players, PDAs, and certain entertainment appliances such as for example so-called "smart TVs," cable or satellite set top boxes, etc. In certain examples, the customized experience can be implemented by customizing a remote control. The customized experience is intended to provide the user with access to their personalized and/or customized settings, including for instance, favorite channels and/or media content that the user is authorized to access. The systems and methods identify the credentials of the user through any suitable means, including for instance, verification of identity at check-in (in the example of checking into a hotel), a secure login on a smart device app or other login, or a proximity identification, such as NFC, Bluetooth, IR, RF, local Wireless signal, etc., to allow the user to access the channels and/or media content on the identified smart devices. The example systems and methods may store user credentials in a remote location (i.e., the cloud) in association with a user identifier, such as an identifier associated with the user's own smart device(s)—for example a cell phone, a personal remote control, a master log-in, biometric information, etc. The credentials and/or preferences may also be stored on a device that the user carries with them.

In at least one example, upon verification of the user identity and customizations associated with the user, the example systems and methods synchronize channel line-ups, including authorized channels, favorites, etc, and optionally synchronize various apps at the remote location to provide the user with the same media they utilize on other devices, such as for example on their home smart devices. In still other examples, the synchronization process has the ability to program the associated remote control with the codes and/or customization needed to operate the remotely located smart device (e.g., to program the remote to control the remote television). In still further examples, the synchronization has the ability to recall various states associated with a device and/or media app, such as pause locations, media currently being watched, etc.). For example and without limitation, the synchronization and/or configuration associated with an app may occur according to a process such as the processes described in U.S. Pat. No. 10,063,625, which is incorporated herein by reference in its entirety. Finally, in order to provide a secure association between the remote smart device and the user, the systems and methods allow for the deletion and/or reverification of the user's credentials upon a user leaving the area temporarily or permanently (e.g., leaving the hotel room or checking-out) to prevent unauthorized access by a different user, such as a new guest, hotel staff, etc.

Referring now to FIG. 1, an example of a system for customizing a smart device, such as a TV 102 or a set top box (STB) 104, is illustrated. While illustrated in the context of a TV 102 and a set top box 104, it will be appreciated by one of ordinary skill in the art that TV 102 and the STB may be separate (as illustrated) or combined into a single unit. Moreover, throughout the following disclosure, while the example methods and systems are directed towards the customization of the TV 102 and/or the STB 104, it will be understood that the examples detailed herein may be equally applicable to any suitable media device including, for instance, a smart phone, tablet, laptop, computer, ereader, gaming system, etc.

In this example, each of the TV 102 and the STB 104 may communicate with a wireless network 106 (or alternatively a wired network as desired). The network 106, in turn, communicates with a network gateway device 108, and a network cloud 110, coupled to a network database 112, accessible via the network cloud 110, in which may be stored user profile data and/or various applications for use by the TV 102. A computer terminal 120 may be coupled to the network cloud 110 to communicate with the various network components as desired. As noted, it is to be understood that controllable appliances may include, but need not be limited to, televisions, cable or satellite converter set-top boxes, cable ready devices, personal computers, etc.

In a further example, a second smart device, such as a smart phone 100 be coupled to the wireless network 106 and may be further adapted to communicate with the STB 104 and/or the TV 102 via any suitable communication protocol 110 including NFC, Wireless Communication, Bluetooth, etc. The example may contain the necessary hardware to enable direct transmission of commands between the TV 102, STB 104, smart phone 100 and the wireless network 106, for example without limitation the technology described in U.S. patent application Ser. No. 13/043,915 which is incorporated herein by reference in its entirety. As is known in the art, appliance commands may be issued in the form of infrared signals 110 as illustrated, or in any other suitable format, e.g., via an RF signal such as contemplated by RF4CE, Zwave, Bluetooth, etc.; ultrasonic signal; visible light; etc. as appropriate for the control of each particular appliance.

Figure 2:
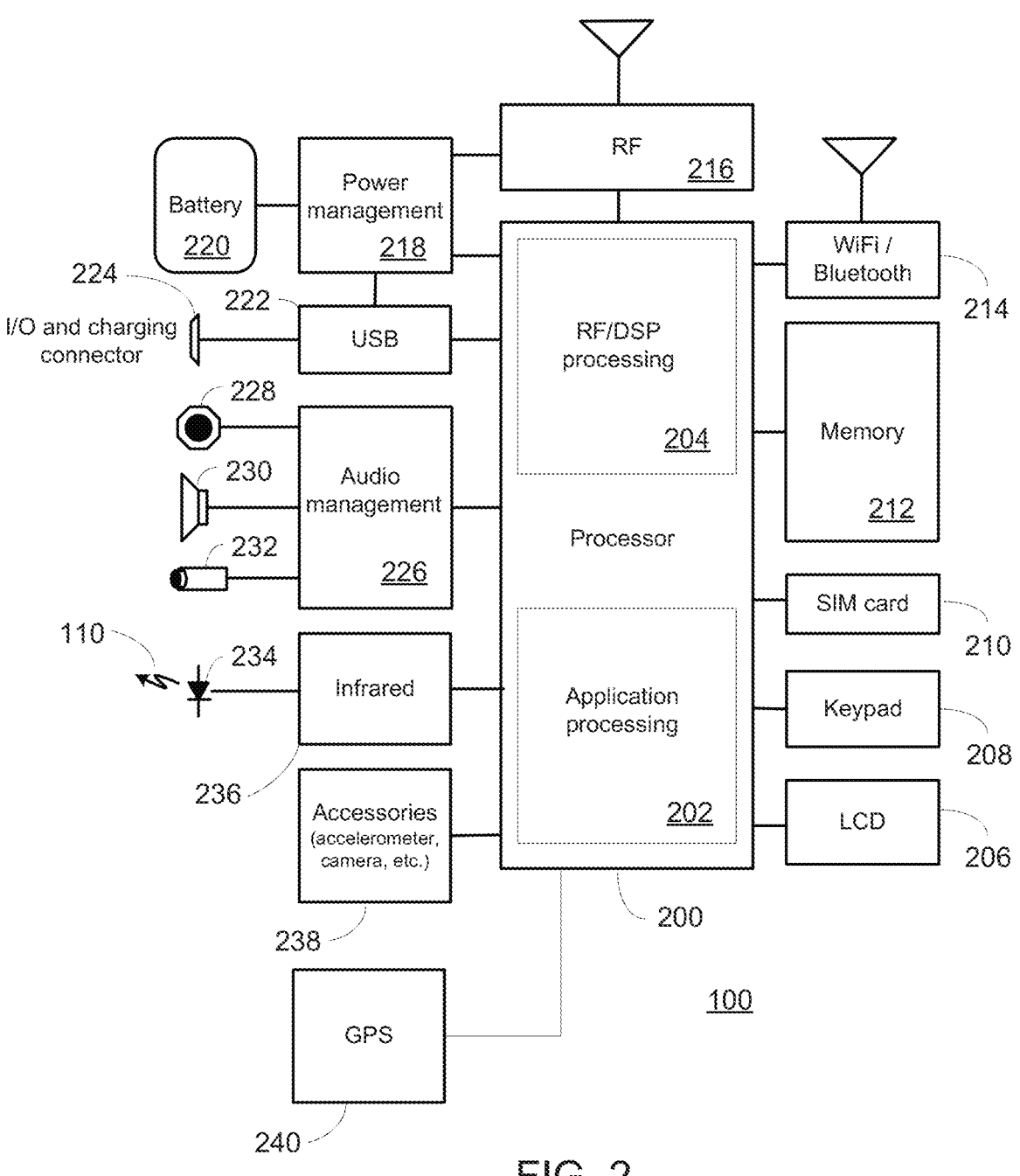
FIG. 2 illustrates in block diagram form exemplary components of the exemplary smart device of FIG. 1.

In the illustrated example, the smart device 100 is a smart phone. It will be understood by one of ordinary skill in the art, however, that the smart device may be more or less sophisticated than a smart phone, such as for instance a fob, a remote control 107, a smart card, personal computer, or other suitable device with communication capabilities. With reference to FIG. 2, as is known in the art, the smart phone 100 may include as needed for a particular application, processing means 200 which may comprise both an application processing section 202 and an RF/DSP processing section 204; an LCD display 206; a keypad 208 which may comprise physical keys, touch keys overlaying LCD 206, or a combination thereof; a subscriber identification module (SIM) card 210; memory means 212 which may comprise ROM, RAM, Flash, or any combination thereof; WiFi and/or Bluetooth wireless interface(s) 214; a wireless telephony interface 216; power management circuitry 218 with associated battery 220; a USB interface 222 and connector 224; an audio management system 226 with associated microphone 228, speaker 230, and headphone jack 232; optional IR communication means comprising a transmitter and/or receiver 236 with associated IR output diode(s) 234, various optional accessory features 238 such as a digital camera, accelerometer, etc., and a GPS 240.

Figure 3:
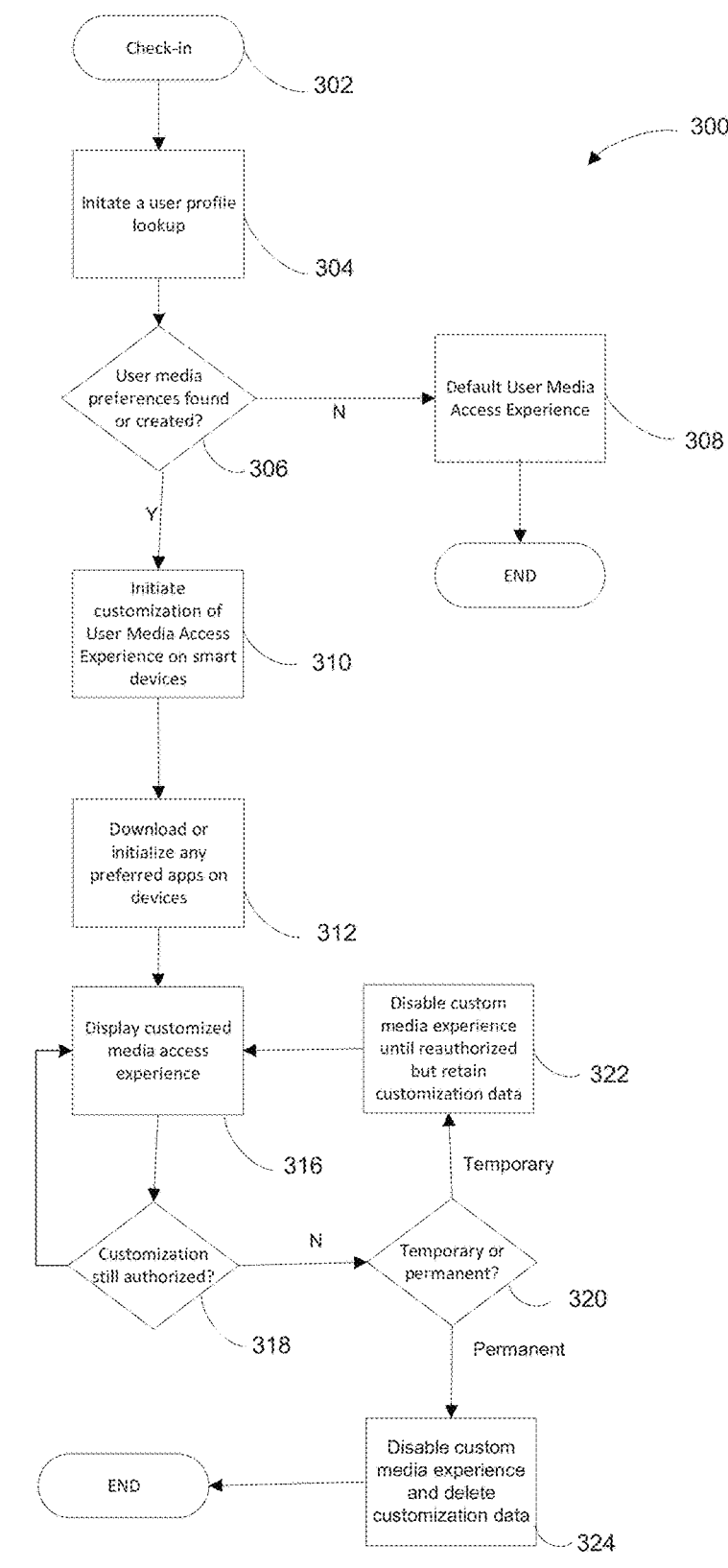
FIG. 3 illustrates in flow chart form an example method for customizing a user experience.

Turning now to FIG. 3, one example of a customized user access experience process 300 may be initiated and performed. In the example illustrated, the process 300 may be initiated by an event step 302 that functions to initiate the user customization process. For example, the event step 302 may be a check-in event, such as a check-in at the front desk or mobile app of a hotel or other travel accommodation via the terminal 120. Upon check-in, the terminal 120 may imitate a look-up of a user profile associated with the user checking in and determine if the user has any customized media access experience preferences stored in the database 112 at the step 304. The user profile may include any number of attributes, including the user's billing preferences, home address, reward membership number, etc., but in this example, the user profile additionally may include media access preferences identified by the user. These attributes may include preferred TV channels or other media preferences such as video streaming apps, music streaming apps, navigational guide preferences, or any other suitable media access preference. The user preferences may be pre-arranged, e.g., pre-populated by the user, populated via a previous visit, or defaulted to standard layouts without customization. Moreover, the user preferences may be populated at the time of check-in by the terminal 120, such as a questionnaire, preference listing, etc.

Upon look-up of any user profile, the process 300 determines if any user media preferences were found in the database 112 or if any preferences were created at the time of check-in at the step 306. If the user does not have any preferences, a default user media experience is provided at the step 308. If, however, user media preferences are retrieved, the process 300 proceeds to customize any smart device associated with the user and on the network 106 at a step 310. During this customization process, the terminal 120 pushes a customization request to the STB 104 and/or the TV 102, or other suitable smart device, such as an iPad, etc., located in the user's room. It will be understood that while the process 300 is disclosed as providing a customized user access experience for the TV 102 and/or the STB 104, the process 300 may be utilized to configure any of the noted suitable smart devices. For instance, the terminal 120 may cause the STB 104 to rearrange the program guide displayed on the TV 102 to correspond to the identified user preferences. In a similar manner, the terminal 120 may cause the TV 102 and/or the STB 104 to download or initialize any preferred apps such as video streaming apps, music streaming apps, weather apps, etc., as identified by the user preferences at the step 312. This customization may optionally include all necessary userid and password combinations to allow any preferred aps to operate without further authorization input from the user.

Once the preferred user elements and/or apps are provided to the TV 102 and/or the STB 104 or are downloaded to or by the devices, any access by the user to the devices will result in the user being shown a customized media access experience. In particular, the user may visualize a preferred user interface, with their preferred guide format, favorites, etc. identified, and, as noted above, the user's preferred apps may be authorized for immediate use. By providing the proper authorization on the noted apps, various functions, such as playback location, purchased items, etc. may be readily available. Other user preferences for other devices and/or aspects of a room, building, etc. may also be provided. For example, user preferences related to light dimming settings (e.g., light level preferences, timing preferences for different light levels, etc.), temperature/thermostat or other climate control settings (e.g., humidity, air quality, etc.), settings for appliances (e.g., refrigerator), settings for bathrooms (e.g., water temperature in sink and/or shower/bath, heated toilet seat settings, shower steamer settings, etc.), settings for a security system, etc., may also be provided so that a user's experience of a home, hotel room, etc. may be customized based on their preferences.

In addition to the TV 102 and/or the STB 104 being customized, the systems and methods disclosed may provide the proper codesets to any associated remote control, or other appliance, either native to the hotel room (e.g., the hotel room's remote control), brought into the room by the user (e.g., the user's personal remote control), or located on, for instance, the user's smart device 100 (e.g., a remote control app located on the smart device 100). Techniques for configuration, programming, and/or remapping of various remote controls or other appliances are well-known to one of ordinary skill in the art and will not be discussed in detail herein.

As one can imagine, security for accessing a user customized media access experience may be of significant importance to some people. More precisely, a user may wish to limit access to their customized media access experience with any number of scenarios including when the user temporarily leaves the room, or permanently leaves the room, such as once the user has checked-out. This authorization process is performed at step 318. In the authorization step 318, the process may perform any suitable manner of authorizing content. For example, the process may simply provide the user with a simple question-and-response prompt on the TV 102, the system may include various sensors, including wired sensors, wireless sensors, and/or motion sensors, all of which are well known to one of ordinary skill in the art, to determine room occupancy and/or proximity of the user to the displayed customized media access experience. In another example, biometric information about a user may be used to enhance security for the user. For example, during check-in to a hotel room, a room key card may be temporarily (e.g., for a predetermined amount of time, for a time until the user checks out and/or the key card is re-programmed or deactivated) programmed with the user's profile information (e.g., preferences) using biometric information for authentication. In this way, the room key may be used to communicate the user's profile to the devices contained within or related to the room whenever the key is present in the room (e.g., when the key card is placed into a key card holder within the room that reads the card using, for example, near field contact (NFC) and/or radio frequency identification (RFID) technology) or presumed to be present in the room (e.g., when the last entry into the room was using the programmed key card). When the user leaves the room (e.g., sensed by the door opening, the lights being turned off, an absence of the key card in a key card holder, motion sensors within the room or outside the room, etc.), access to the user's profile is cut-off or otherwise disabled. However, the user may return to the room, so the user's profile may remain on the devices and/or the key card until the user checks-out of the hotel to continue to provide a seamless user experience no matter how many times they leave or enter the room.

If the display of the customization is determined to not be authorized, the customization information is temporarily disabled, in the case where the user intends to return to the location—e.g., the user is still a registered guest (steps 320, 322), or the customization information is permanently deleted, in the case where the user is no longer a registered guest—e.g., the user is checked-out. (steps 320, 324). In the step 322, reauthorization may be any passive or active step performed by the user, or the system, including a sensor detection by the system, or a positive authorization step by the user, such as a button press, etc.

In still another example, the user may provide a security and/or privacy setting to enable a "do not track" mode that may be turned on or off and furthermore, may be specifically limited to various devices, situations, locations, etc., or may be globally applied to all monitoring devices. For instance, the "do not track" mode may be applicable to any "smart" device, such as speakers, cameras, STBs, TVs, or other suitable device that may track user presence in the environment. Still further, the "do not track" mode may be applied to the customized user access experience at a remote location, as described herein, or may be applied in any other suitable location, including home, work, retail spaces, etc.

Figure 4:
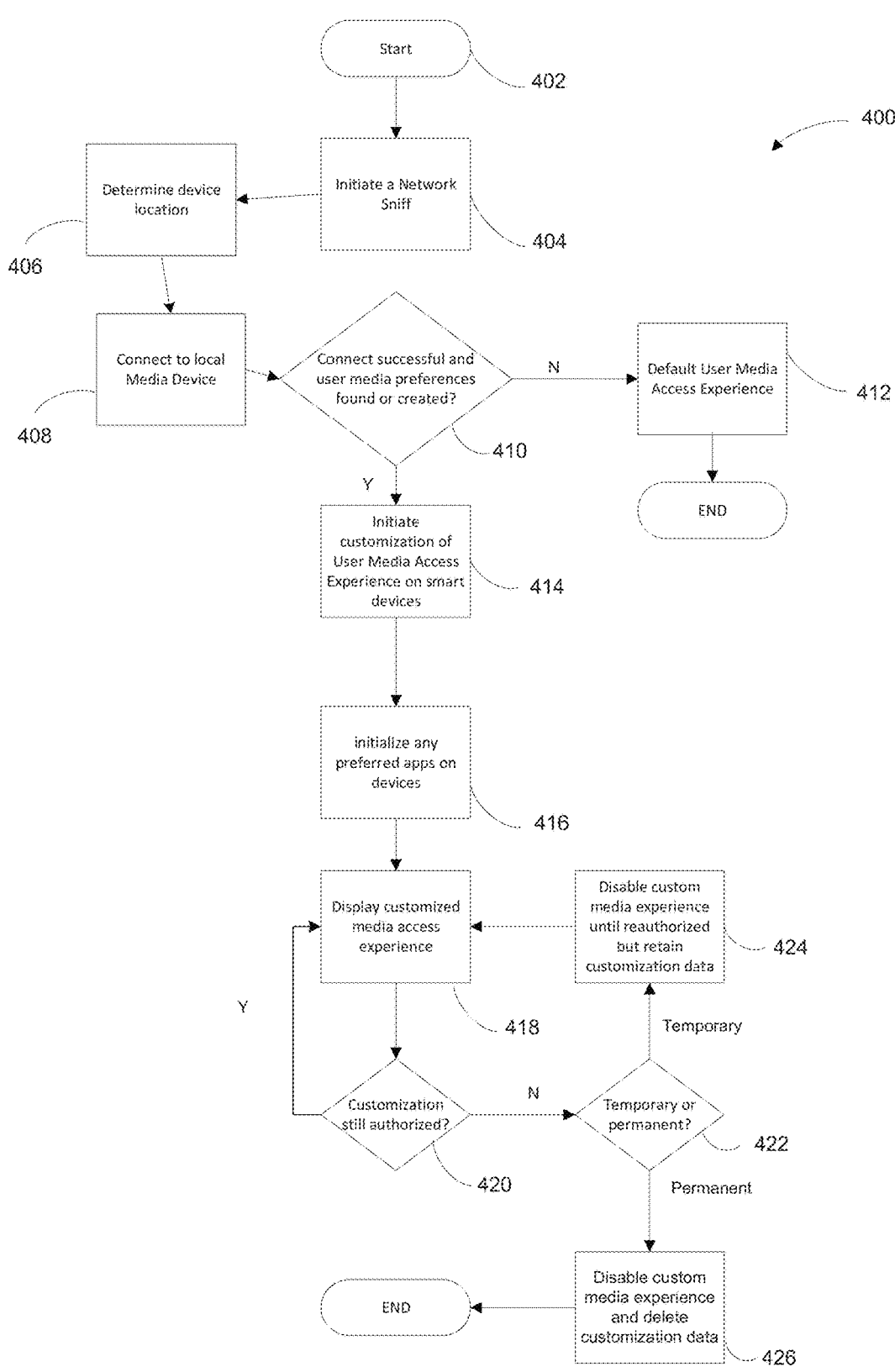
FIG. 4 illustrates another flow chart of an example method for customizing a user experience.

Turning now to FIG. 4, another example of a customized user access experience process 400 at a remote location, such as a hotel or the like, may be initiated and performed.

In this example, the process 400 may be initiated by an event step 402 that functions to initiate the user customization process. Specifically, the smart device 100 may initiate an app in step 402 that functions to determine if the smart device 100 is within the range of the wireless network 106. If the smart device 100 becomes, or is already, a member of the network 106, the app may then initiate a network sniff 404 to thereby locate and properly identify the TV 102 and/or the STB 104, which may also be a member of the same wireless network 106.

For example, the smart device 100 may connect to the wireless network 106 and the target TV 102 and/or the STB 104, also being a member of that network 106, may identify itself to the smart device 100 or be requested to identify itself to the smart device 100. During this process, the smart device 100 is also caused to determine 406 its own device location within the entirety of the remote location, such as for example, the smart device's registered hotel number, via use of GPS services, via cell phone location services, login data comparison and/or the like. While not required, the smart device app may cause the determined smart device location to be displayed to thereby allow the user to confirm that location. After the user confirms the location (if applicable), the smart device 100 and the local TV 102 and/or the STB 104 initiate a two-way communication connection 408, either directly or through the network 106. It will be appreciated that any communication between the smart device 100 and the TV 102 and/or the STB 104 may be displayed within an optional GUI confirmation screen to allow the user to optionally confirm the connection, and allow the communication of previously stored user preferences or the creation of new user preferences 410.

As with the process 300, the user profile in this example may include any number of attributes, including the user's billing preferences, home address, reward membership number, the user's media access preferences, such as preferred TV channels or other media preferences such as video streaming apps, music streaming apps, navigational guide preferences, or any other suitable media access preference. The user preferences may be pre-arranged, e.g., pre-populated by the user, populated via a previous visit, or defaulted to standard layouts without customization 412.

As with the process 300, if the user does not have any preferences, a default user media experience is provided at the step 412. If, however, user media preferences are retrieved, the process 400, proceeds to customize the TV 102 and/or the STB 104 at a step 414. During this customization process, the smart device 100 pushes customization data to the TV 102 and/or the STB 104. Alternatively, the process 400 may cause the TV 102 and/or the STB 104 to retrieve, download or initialize any preferred apps such as video streaming apps, music streaming apps, weather apps, etc., as identified by the user preferences from the smart device 100. As with the previous example, this customization may optionally include all necessary userid and password combinations to allow any preferred aps to operate without further authorization input from the user at a step 416.

Once the preferred user elements and/or apps are provided to the TV 102 and/or the STB 104, any access by the user to the TV 102 and/or the STB 104 will result in the user being provided with a customized media access experience 418. In particular, the user may visualize a preferred user interface, with their preferred guide format, favorites, etc. identified, and, as noted above, the user's preferred apps— such as streaming apps—may be authorized for immediate use. By providing the proper authorization on the noted apps, various functions, such as playback location, purchased items, etc. may be readily available.

Various embodiments may include opportunities to stream, use, or otherwise view content that is related to apps or services only the user has access to and/or related to apps or services only the facility (e.g., hotel) has access to. As a non-limiting example, the content provider associated with a STB in a hotel room may not correspond with a user's content provider (e.g., the hotel may have a satellite TV provider while the user has a cable company TV provider). When the user's preferences and/or profile are determined, the system may determine that the user's preferences are not aligned with the provider of the STB in the room. Upon such a detection, a notification may be provided to the user (e.g., through the user's smart device 100, the TV 102, etc.) that provides them with various options for accessing content from different providers. For example, an option may be to access the content provided via the STB in the room. Another option presented to the user may be an option to stream content available to the user on their smart device to a device in the room (e.g., stream content from a smart phone laptop/tablet to a TV and/or speaker, etc.). In such an example, selection by the user of the option to stream content available to the user may initiate the user's content provider app on the user's smart device and may also initiate streaming of that content to a device in the room (e.g., TV). Yet another option presented to the user may be an option to stream data from a user device that is already active. For example, if a user opens a content provider app on their smart device (e.g., laptop, phone, tablet), a notification to the user may be displayed on the smart device or a device in the room (e.g., TV) requesting whether the user would like to stream the content to the device in the room. In some embodiments, the active smart device may be automatically detected by the room and the content may be automatically streamed to a room device. For example, if a user opens a content provider app on a smart device and selects content to watch, that content may be automatically streamed to the device in the room because the synchronization between the devices in the room and the user's devices has already occurred. In another option presented to the user, the user may indicate that content from an STB may be streamed to a user device. For example, if the user accesses content through the STB but wants to continue watching the content in the bathroom, the user may select an option to stream the STB content to their smart device (e.g., tablet, phone, laptop) so that the user may carry the smart device into the bathroom. In yet another option that may be presented to a user, the user may specify which device they prefer to stream from and/or otherwise control content being displayed on a room device (e.g., TV). For example, the user may select a laptop to use for streaming content to a room device and/or control a room device. The user may also select other devices such as a tablet or smart phone. The user may also switch between devices such that all their devices may control devices in the room and/or stream content to the room device(s). In such examples, one, some, or all of the user's devices may be capable of controlling and/or streaming to the room devices at any given time. In addition, the multiple devices of a user may be used to hand off streaming, for example, if a user device's battery gets low or dies. In this way, the streaming may not be interrupted merely because a user device's battery is low or dead. Accordingly, the room may present the user with many different functionalities and options. Such functionalities and options may even be presented to the user even if they do not have a different content provider than an STB.

In addition to the TV 102 and/or the STB 104 being customized, the systems and methods disclosed may provide the proper codesets to any associated remote control, or other appliance, either native to the hotel room (e.g., the hotel room's remote control), brought into the room by the user (e.g., the user's personal remote control), or located on, for instance, the user's smart device 100 (e.g., a remote control app located on the smart device 100). Techniques for configuration, programming, and/or remapping of various remote controls or other appliances are well-known to one of ordinary skill in the art and will not be discussed in detail herein.

Any authorization process is optionally performed at step 420. In the authorization step 420, the process may perform any suitable manner of authorizing content. For example, the process may simply provide the user with a time limit (e.g., until 10 am the next day, etc.), simple question-and-response prompt on the TV 102, or as previously described, the system may include various sensors to determine room occupancy and/or proximity of the user to the displayed customized media access experience.

If the display of the customization is determined 420 to no-longer be authorized, the customization information is temporarily disabled 422, in the case where the user intends to return to the location—e.g., the user is still a registered guest (steps 422, 424), or the customization information is permanently deleted, in the case where the user is no longer a registered guest—e.g., the user is checked-out. (steps 422, 426).

Figure 5:
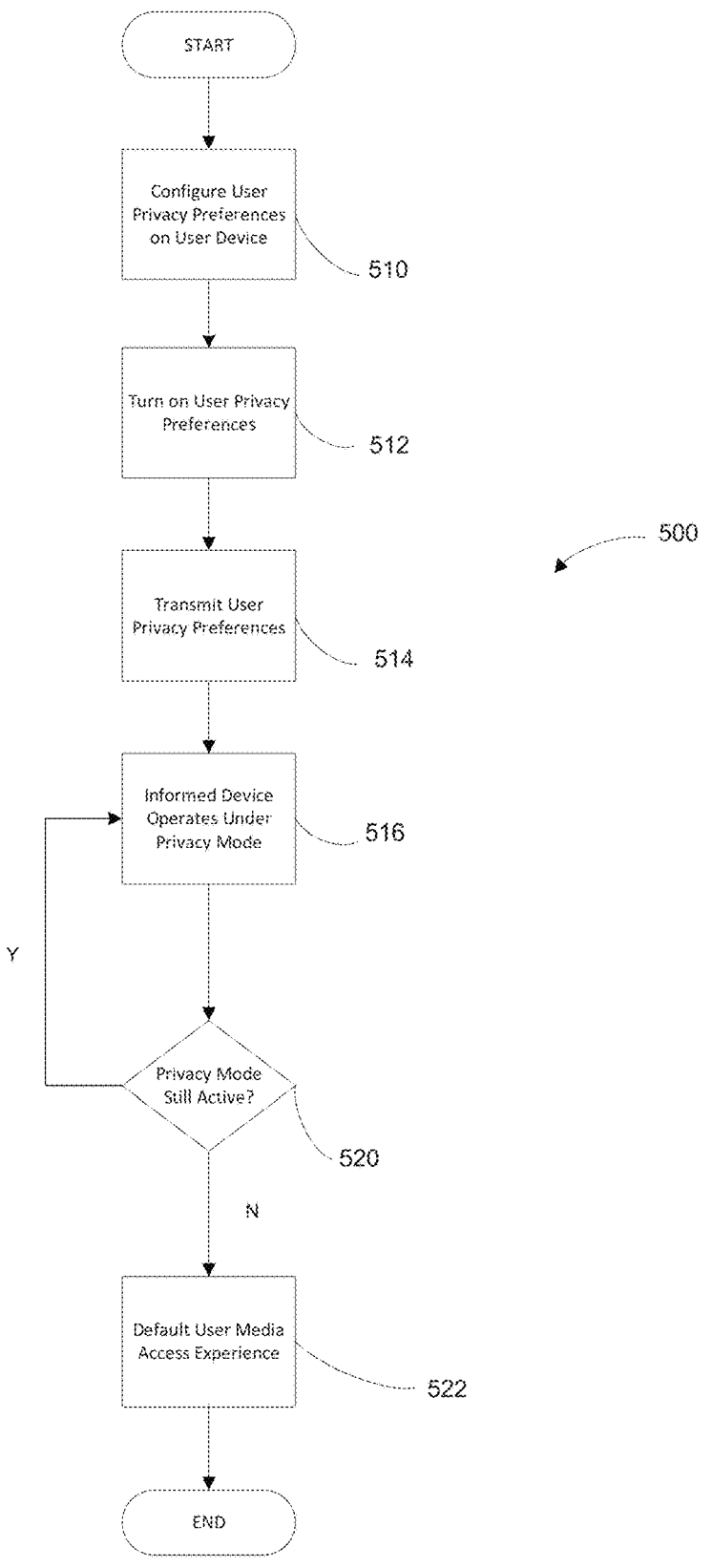
FIG. 5 illustrates another flow chart of an example method for customizing a user experience by providing a "do not track" user option.

Referring now to FIG. 5, an example "do not track" process 500 is illustrated. In this example process, a user first configures their user device, such as a personal remote control or a personal smart phone, with various "do not track" preferences (step 510), including for instance, whether the user preference is to configure the device to avoid tracking by all compatible devices, including various other smart devices, such as the TV 102, the set top box (STB) 104, or other suitable device such as a smart camera, smart doorbell, virtual assistant, etc., or whether the user preference is to configure their personal device to avoid tracking by only certain compatible other devices.

Once the "do not track" preference is configured, the feature may be turned on or off (i.e. activated or deactivated) as desired by the user (step 512). Turning on the feature may result in a persistent "on" state (e.g., until actively turned "off"), or may result in a temporary or limited "on" state (e.g. activated on demand and turned off upon satisfaction of some condition). In one example the configured user device may actively broadcast a "do not track" request (step 514). Alternatively, the configured user device may listen for a polling signal by various smart devices in the area and once received, the device may answer the polling with a "do not track" request (step 514). In either instance, once the "do not track" request is transmitted to the local smart devices (i.e., the informed device), the informed device may confirm receipt, and begin a non-tracking mode, which may be a default mode, or specialized "do not track" mode as identified by the informed device. For instance, in one example, the TV 102 or the STB 104 may acknowledge receipt of the "do not track" request and default its configuration to a normal, non-customized operating mode, such that no user preferences will be utilized as described herein. Still further, in some example, such as when the smart device is a smart camera, a smart doorbell, a virtual assistant, face detection unit, or other similar device, the "do not track" mode may shut off or disable the camera, microphone, or other personal information collection devices. It'll be appreciated that the configured user device may continue to transmit a "do not track" request until acknowledged by a n informed device, or for a set amount of time to conserve battery life as desired.

Once the "do not track" request is transmitted and acknowledged, the informed device will operate in a "do not track" mode or other non-personalized configuration (step 516) for a predetermined time or until the configured user device informs the informed device that the mode is turned "off" or otherwise cancelled (step 516). It will be appreciated by one of ordinary skill in the art that similar to requesting the "do not track" operation, the configured user device may actively broadcast the cancelation of the "do not track" request or may alternatively respond to a polling from the informed device (step 520). Once the "do not track" request is rescinded, canceled, ended, or otherwise turned "off", the informed smart device may return to a personalized configuration (e.g., in the instance of the TV 102 or the STB 104) or to a normal operation mode where personal information may be collected by the informed device (e.g., a camera, virtual assistant, smart doorbell, etc.).

With the example process 500, a number of objectives may be obtained. In particular, as noted, the personal device is capable of broadcasting configured personal privacy settings to inform various smart devices to turn off various features based upon the broadcasted privacy settings. The configuration may occur through any suitable profile creation mechanism (e.g., webpage login), including through a user account, an app on the personal device itself, or a third party app, etc. As will be understood, the user device may communicate through any suitable wired or wireless protocol, including for instance, infrared (IR), radio frequency (RF), Bluetooth low energy (BLE), etc.

In some examples, the personal user device can be a wearable or transportable device that acts as a beacon which always broadcast as soon as the user enters a building, home, business, office, hotel, resort, etc. It will be understood that due to various other security settings on the informed device, the informed device may partially or wholly ignore or comply with the "do not track" request. In one instance, a security camera can be moved off-line, but still perform facial recognition. In another instance, the camera can stop pushing video to the cloud once the user enters the room, but may still receive and/or record the video.

In another example, the personal user device is not beacon (active or passive) based, but rather the personal preferences, including the "do not track" preference, may include a hybrid solution where piecemeal data is gathered by one or more tracking devices and the data is used to triangulate the user's location and preference. The data crunching may be performed by any suitable service where the information (privacy profile) is passed through by a master device to the data crunching service. For example, body sensing and motion detection may be performed by different devices and the data may be sent to a primary device which can create rules on the device based on the information received (e.g. facial recognition, GPS data (such as a cell phone). It will be further recognized that by having a transportable personal device, personalized rules can follow the user within the same building and moreover, each person in the room (or local environment) can have different profiles. For example, a child entering a room would never allow video to be captured and pushed to the cloud.

In still other instance, the informed smart device, such as a smart TV may decide to tag or not tag the personalized content, such as advertisements, based on the privacy profile. In yet another example a user installs cameras in their home for security purposes and although the entire system may be disarmed, it may be desirable to continue to record in various locations to provide protection in places that the user is not physically at. In this instance, the user may configure their user device to cause the cameras to automatically stop recording as you enter a coverage area (e.g., a room), and yet start recording again as you leave that area. Finally, it will be appreciated that in still other example, a master translation device may partially process and/or format any data and place it in a format suitable for sending the to the data service and/or informed device for further processing.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. All patents cited within this document are hereby incorporated by reference in their entirety.

We claim:

1. A non-transitory, computer-readable media having stored thereon instruction wherein the instructions, when executed by a first device, causing the first device to perform steps comprising:
    receiving from a second device a user privacy preference configured by a user at the second device;
    using the user privacy preference configured by the user to cause the first device to operate in a first configuration that is unlinked to any user;
    receiving from the second device an expiration of the user privacy preference configured by the user; and
    in response to receiving from the second device the expiration of the user privacy preference configured by the user, causing the first device to operate in a second configuration that is linked to the user.

2. The non-transitory, computer-readable media of claim 1, wherein the first device is a remote control.

3. The non-transitory, computer-readable media of claim 1, wherein the instructions further cause the first device to verify the user privacy preference configured by the user.

4. The non-transitory, computer-readable media of claim 1, wherein the user privacy preference configured by the user is received from the second device via an active beacon broadcast.

5. A non-transitory, computer-readable media having stored thereon instruction wherein the instructions, when executed by a first device, causing the first device to perform steps comprising:
    receiving from a second device a user privacy preference configured by a user at the second device;
    using the user privacy preference configured by the user to cause the first device to operate in a first configuration that is unlinked to any user;
    detecting that the first device is not in proximity to the second device; and
    in response to detecting that the first device is not in proximity to the second device, causing the first device to operate in a second configuration that is linked to the user.

6. The non-transitory, computer-readable media of claim 5, wherein the first device is a remote control.

7. The non-transitory, computer-readable media of claim 5, wherein the instructions further cause the first device to verify the user privacy preference configured by the user.

8. The non-transitory, computer-readable media of claim 5, wherein the user privacy preference configured by the user is received from the second device via an active beacon broadcast.

9. A non-transitory, computer-readable media having stored thereon instruction wherein the instructions, when executed by a first device, causing the first device to perform steps comprising:
    receiving from a second device a user privacy preference configured by a user at the second device;
    using the user privacy preference configured by the user to cause the first device to operate in a first configuration that is unlinked to any user;
    determining an expiry of a predetermined time period from receiving the user privacy preference configured by the user; and
    in response to determining the expiry of the predetermined time period from receiving the user privacy preference configured by the user, causing the first device to operate in a second configuration that is linked to the user.

10. The non-transitory, computer-readable media of claim 9, wherein the first device is a remote control.

11. The non-transitory, computer-readable media of claim 9, wherein the instructions further cause the first device to verify the user privacy preference configured by the user.

12. The non-transitory, computer-readable media of claim 9, wherein the user privacy preference configured by the user is received from the second device via an active beacon broadcast.

13. The non-transitory, computer-readable media as recited in claim 1 wherein the user privacy preference configured by the user includes data that specifies a plurality of devices including the first device.

14. The non-transitory, computer-readable media as recited in claim 5 wherein the user privacy preference configured by the user includes data that specifies a plurality of devices including the first device.

15. The non-transitory, computer-readable media as recited in claim 9 wherein the user privacy preference configured by the user includes data that specifies a plurality of devices including the first device.

16. A non-transitory, computer-readable media having stored thereon instruction wherein the instructions, when executed by a first device, causing the first device to perform steps comprising:
    receiving from a second device a user privacy preference configured by a user at the second device;
    using the user privacy preference configured by the user to modify the operation of the first device from a first operating mode in which the first device is free to track a presence of the user to a second operating mode in which the first device is inhibited from tracking the presence of the user;
    receiving from the second device an expiration of the user privacy preference configured by the user; and
    in response to receiving from the second device the expiration of the user privacy preference configured by the user, returning the operation of the first device from the second operating mode to the first operating mode wherein the user privacy preference configured by the user includes data that specifies a feature of the first device that is to be turned off.

17. The non-transitory, computer-readable media as recited in claim 5 wherein the user privacy preference configured by the user includes data that specifies a feature of the first device that is to be turned off.

18. The non-transitory, computer-readable media as recited in claim 9 wherein the user privacy preference configured by the user includes data that specifies a feature of the first device that is to be turned off.

* * * * *